INVENTOR.
RUSSELL G. WOLFE,
BY
ATTORNEYS.

3,012,317
METHOD OF MAKING WELDED SPROCKETS
Russell G. Wolfe, Indianapolis, Ind., assignor to Diamond Chain Company, Inc., Indianapolis, Ind., a corporation of Indiana
Filed Aug. 2, 1957, Ser. No. 675,890
1 Claim. (Cl. 29—479)

This invention relates to the formation of a welded joint between two metal parts the first of which is received in an opening in the second and projects outwardly from a face of such second part. When parts so assembled are welded together by a fillet weld surrounding the projecting part, certain precautions must be taken to permit the escape of gases from the weld metal, as otherwise such gas would be entrapped and form bubbles or voids lowering the strength of the weld. Among expedients proposed for facilitating the escape of gas has been the cutting of axially extending grooves in the wall of the opening of the second part, such grooves permitting flow of gas from the site of the weld between the two parts. This expedient operates satisfactorily to accomplish the desired result, but the operation of cutting grooves is relatively expensive.

It is an object of this invention to provide economically for the escape of gas from a fillet weld joining two parts one of which has an opening extending through it and receiving the other part.

In carrying out my invention, I subject that end of the first part which is to be received in the second part to a knurling operation which causes cold flow of the metal from which the first part is formed and creates alternating axially extending grooves and ribs. The original diameter of the first part is preferably such that the diameter of the opening in the second part will be intermediate the outer and base diameters of the knurled portion. With the first part knurled as described, the knurled portion is subjected to a machining operation which removes the crests of the ribs and reduces the knurled portion to a diameter such that it will have a slip fit within the opening of the second part. As the base diameter of the knurled portion was less than the diameter of such opening, the removal of the rib-crests does not eliminate the grooves. The axial extent of the grooves is such that when the parts are properly positioned axially, the grooves will extend outwardly beyond the face of the second part into the region which will be covered by the fillet of weld metal. When the weld metal is applied, it will be deposited over the projecting ends of the grooves, and such grooves will therefore form a path for the escape of gas through the second part.

In the accompanying drawing, which illustrates an embodiment of the invention:

Figure 1:
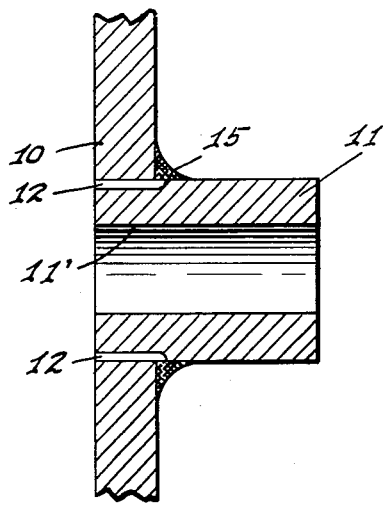
FIG. 1 is a fragmental axial section through a joint between a sprocket hub and disk.
Figure 2:
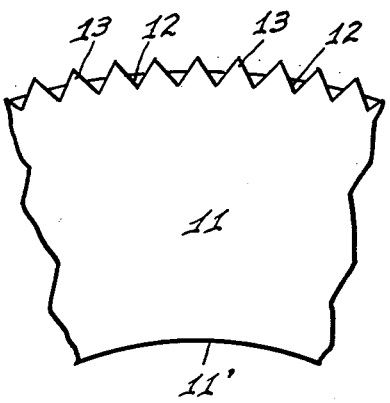
FIG. 2 is a fragmental end elevation of the hub on an enlarged scale showing the condition existing following the knurling operation.
Figure 3:
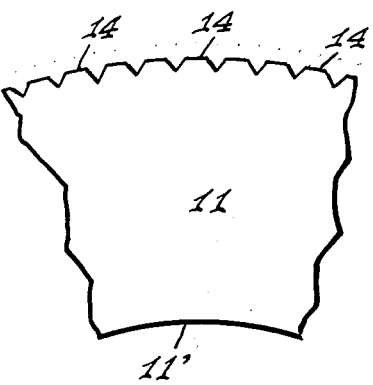
FIG. 3 is a view similar to FIG. 2 showing the knurled portion of the hub reduced to its ultimate overall diameter.

In FIG. 1, I have shown a sprocket disk or plate 10 provided with a central opening which is to receive a hub 11. That end of the hub which is to be received in the opening in the plate 10 has an initial diameter approximately equal to that of such opening. Knurling of the hub-end in accordance with my invention produces the condition illustrated on an enlarged scale in FIG. 2. The teeth of the knurl form in the surface of the hub 11 a series of circumferentially spaced grooves or depressions 12, and the metal displaced in the formation of such grooves flows to form ribs 13 alternating with the grooves. Because the ribs 13 are formed by cold flow of the metal, the diameter over them is somewhat greater than the original diameter of the hub and greater than the diameter of the opening in the plate 10. The base diameter of the knurled hub-portion, however, is less than the diameter of the opening in the plate 10.

Following the knurling operation, the hub is machined to reduce the overall diameter of the knurled portion to that of the opening 10. In this machining, the crests of the ribs 13 are removed leaving the grooves 12 separated by narrow areas 14 forming segments of a cylindrical surface concentric with the bore 11' of the hub.

With the hub machined as just described, it is inserted into the opening in the plate 10 into the position indicated in FIG. 1 and an annular fillet 15 of weld metal is deposited to secure the plate and hub together. Such weld metal may be deposited either by arc or gas welding; and during the welding operation, the plate and hub will be held accurately concentric with each other by the fit of the areas 14 against the periphery of the opening in the plate.

The axial extent of the grooves 12 formed by the knurling operation is such that their closed ends project outwardly beyond the face of the plate 10 to be covered by the weld metal 15. As a result, the grooves are open to the weld metal and any gas in the weld metal can escape along the grooves 12 through the plate 10, as the remote ends of such grooves are unoccluded and open to atmosphere.

It will be understood that the sprocket illustrated and above described is employed merely as an illustration of one structure in the production of which my invention is useful. It should also be understood that the operation of removing the crests of the ribs formed by knurling may be dispensed with in some instances, as when the requirements as to accuracy, and particularly concentricity, are not strict. In such cases, that end of the hub which is to be received in the plate is turned slightly undersize so that the knurling operation will bring the overall diameter of the knurled portion up to approximately that of the opening in the plate.

I claim as my invention:

In a method of making a welded structure comprising a first part of circular cross-section received in a circular opening extending through a second part, the steps of forming the first part with a diameter somewhat less than that of said circular opening, knurling the first part to provide on its surface an annular series of alternating grooves and ribs, the diameter of the knurled portion over the crests of said ribs being initially greater than the diameter of said opening and the base diameter of the knurled portion being less than the diameter of said opening, removing the crests of said ribs to reduce the diameter over the ribs to substantially that of said opening while leaving grooves between the ribs, positioning the knurled portion of the first part in the opening of the second part with said grooves extending in said opening and projecting beyond one end thereof, welding the two parts together by depositing an annular fillet of weld metal over the projecting ends of said grooves, the said deposition of weld metal being performed with the opposite ends of said grooves open to the atmosphere to permit exhaustion through the grooves of gases emitted from the weld metal as it is deposited.

References Cited in the file of this patent

UNITED STATES PATENTS

| | | |
|---|---|---|
| 243,897 | Hill | July 5, 1881 |
| 2,034,808 | Graham | Mar. 24, 1936 |
| 2,144,332 | Glaser | Jan. 17, 1939 |
| 2,409,795 | Rabezzana | Oct. 22, 1946 |
| 2,416,204 | Nelson | Feb. 18, 1947 |
| 2,463,006 | Clute | Mar. 1, 1949 |
| 2,832,570 | Schoesson | Apr. 29, 1958 |

OTHER REFERENCES

Welding Handbook, third edition, page 938. Published by American Welding Society, New York, N.Y. Copy in Div. 14.